(12) United States Patent
Kuo et al.

(10) Patent No.: US 12,105,382 B2
(45) Date of Patent: Oct. 1, 2024

(54) OPTICAL DEVICE

(71) Applicant: InnoLux Corporation, Miao-Li County (TW)

(72) Inventors: Chih-Chin Kuo, Miao-Li County (TW); Mao-Shiang Lin, Miao-Li County (TW); Hsu-Kuan Hsu, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 0 days.

(21) Appl. No.: 18/457,651

(22) Filed: Aug. 29, 2023

(65) Prior Publication Data

US 2024/0111192 A1 Apr. 4, 2024

(30) Foreign Application Priority Data

Sep. 29, 2022 (CN) .......................... 202211213389.9

(51) Int. Cl.
*G02F 1/1339* (2006.01)
(52) U.S. Cl.
CPC ........ *G02F 1/1339* (2013.01); *G02F 2203/01* (2013.01)
(58) Field of Classification Search
CPC ..................................................... G02F 1/1339
See application file for complete search history.

(56) References Cited

U.S. PATENT DOCUMENTS

| | | | | |
|---|---|---|---|---|
| 2003/0193289 | A1* | 10/2003 | Shirakawa | H05B 33/12 313/512 |
| 2012/0146493 | A1* | 6/2012 | Ra | H10K 59/131 313/512 |
| 2017/0351141 | A1* | 12/2017 | Kubota | G02F 1/133512 |
| 2020/0303184 | A1* | 9/2020 | Lin | H01L 21/76826 |

FOREIGN PATENT DOCUMENTS

| | | |
|---|---|---|
| CN | 107817639 A | 3/2018 |
| CN | 114420679 A | 4/2022 |

* cited by examiner

*Primary Examiner* — Sang V Nguyen
(74) *Attorney, Agent, or Firm* — MUNCY, GEISSLER, OLDS & LOWE, P.C.

(57) ABSTRACT

An optical device includes: a first substrate; a second substrate disposed opposite to the first substrate; a first conductive layer disposed on the first substrate, wherein the first conductive layer includes a first surface and a third side surface connecting to the first surface; a second conductive layer disposed on the second substrate; a sealant disposed between the first conductive layer and the second conductive layer and having a first side and a second side opposite to the first side; a liquid crystal layer disposed between the first conductive layer and the second conductive layer and locating at the first side of the sealant; and a barrier layer disposed between the first conductive layer and the second conductive layer and locating at the second side of the sealant, wherein at least part of the first surface and the third side surface are not covered by the barrier layer.

19 Claims, 6 Drawing Sheets

OPTICAL DEVICE

CROSS-REFERENCE TO RELATED APPLICATIONS

This application claims the benefits of the Chinese Patent Application Serial Number 202211213389.9, filed on Sep. 29, 2022, the subject matter of which is incorporated herein by reference.

BACKGROUND OF THE INVENTION

Field

The present disclosure relates to an optical device. In particular, the present disclosure relates to an optical device with the peripheral region having special design.

Description of Related Art

In recent years, with the development of science and technology and the increasing awareness of environmental protection, various energy-saving and carbon-reducing products have developed accordingly, for example, optical devices such as smart windows. A smart window refers to a device in which the light transmittance thereof can be adjusted to change the glass plate of the window to a light-transmitting state, a dark state, or a fog state, so as to achieve light transmission and/or heat insulation and other effects. In addition, since the smart window can also have functions such as shielding and/or privacy, it can also be applied to meeting rooms, interior partition design, etc., so that the space can be used more flexibly.

However, in practice, in order to simplify the manufacturing process or save costs, the sealant of the optical device is often in direct contact with conductive materials, resulting in defects such as abnormal appearance or poor reliability of the optical device.

Therefore, it is desirable to provide a novel optical device to improve the conventional defects.

SUMMARY OF THE INVENTION

The present disclosure provides an optical device, which comprises: a first substrate; a second substrate disposed opposite to the first substrate; a first conductive layer disposed on the first substrate, wherein the first conductive layer comprises a first surface and a third side surface, and the first surface is connected to the third side surface; a second conductive layer disposed on the second substrate; a sealant disposed between the first conductive layer and the second conductive layer and having a first side and a second side, wherein the first side is opposite to the second side; a liquid crystal layer disposed between the first conductive layer and the second conductive layer and locating at the first side of the sealant; and a barrier layer disposed between the first conductive layer and the second conductive layer and locating at the second side of the sealant, wherein at least part of the first surface and the third side surface are not covered by the barrier layer.

The present disclosure further provides another optical device, which comprises: a first substrate having a first side surface; a second substrate having a second side surface, wherein the second substrate is disposed opposite to the first substrate; a first conductive layer disposed on the first substrate, wherein the first conductive layer has a third side surface, and the third side surface is adjacent to the first side surface; a second conductive layer disposed on the second substrate, wherein the second conductive layer has a fourth side surface, and the fourth side surface is adjacent to the second side surface; a sealant disposed between the first conductive layer and the second conductive layer; a liquid crystal layer disposed between the first conductive layer and the second conductive layer, wherein the sealant surrounds the liquid crystal layer; a first insulating layer disposed on the first conductive layer and disposed between the first conductive layer and the sealant; and a second insulating layer disposed on the second conductive layer and disposed between the second conductive layer and the sealant.

Other novel features of the disclosure will become more apparent from the following detailed description when taken in conjunction with the accompanying drawings.

DETAILED DESCRIPTION OF THE INVENTION

Figure 1:
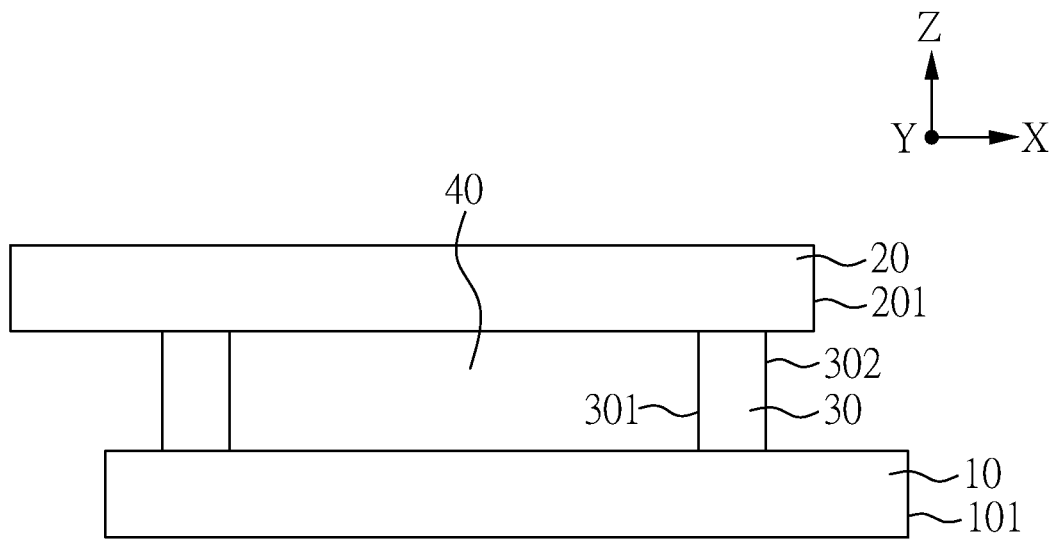
FIG. 1 is a perspective view of an optical device according to one embodiment of the present disclosure.

The following is specific embodiments to illustrate the implementation of the present disclosure. Those who are familiar with this technique can easily understand the other advantages and effects of the present disclosure from the content disclosed in the present specification. The present disclosure can also be implemented or applied by other different specific embodiments, and various details in the present specification can also be modified and changed according to different viewpoints and applications without departing from the spirit of the present disclosure.

It should be noted that, in the present specification, when a component is described to have an element, it means that the component may have one or more of the elements, and it does not mean that the component has only one of the element, except otherwise specified. Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

In the specification and the appended claims of the present disclosure, certain words are used to refer to specific elements. Those skilled in the art should understand that electronic device manufacturers may refer to the same components by different names. The present specification does not intend to distinguish between elements that have the same function but have different names.

In the following description and claims, words such as "comprising", "including", "containing", and "having" are open-ended words, so they should be interpreted as meaning "containing but not limited to . . . ". Therefore, when the terms "comprising", "including", "containing" and/or "having" are used in the description of the present disclosure, they specify the existence of corresponding features, regions, steps, operations and/or components, but do not exclude the existence of one or more corresponding features, regions, steps, operations and/or components.

The terms, such as "about", "equal to", "equal" or "same", "substantially", or "approximately", are generally interpreted as within 10%, 5%, 3%, 2%, 1%, or 0.5% of a given value or range. The quantity given here is an approximate quantity, that is, without specifying "about", "approximately", "substantially" and "approximately", "about", "approximately", "substantially" and "approximately" can still be implied. Furthermore, when a value is "in a range from a first value to a second value" or "in a range between a first value and a second value", the value can be the first value, the second value, or another value between the first value and the second value.

In the present specification, except otherwise specified, the terms (including technical and scientific terms) used herein have the meanings generally known by a person skilled in the art. It should be noted that, except otherwise specified, in the embodiments of the present disclosure, these terms (for example, the terms defined in the generally used dictionary) should have the meanings identical to those known in the art, the background of the present disclosure or the context of the present specification, and should not be read by an ideal or over-formal way.

In addition, relative terms such as "below" or "under" and "on", "above" or "over" may be used in the embodiments to describe the relative relationship between one element and another element in the drawings. It will be understood that if the device in the drawing was turned upside down, elements described on the "lower" side would then become elements described on the "upper" side. When a unit (for example, a layer or a region) is referred to as being "on" another unit, it can be directly on the another unit or there may be other units therebetween. Furthermore, when a unit is said to be "directly on another unit", there is no unit therebetween. Moreover, when a unit is said to be "on another unit", the two have a top-down relationship in a top view, and the unit can be disposed above or below the another unit, and the top-bottom relationship depends on the orientation of the device.

In the present disclosure, the measurement of width, thickness and distance may be achieved by using an optical microscope or from a cross-sectional image of an electron microscope; but the present disclosure is not limited thereto. In the present disclosure, the contact angle can be measured by the sessile drop method using a suitable contact angle meter. Furthermore, any two values or directions used for comparison may have certain errors. If the first value is equal to the second value, it implies that there may be an error of about 10% between the first value and the second value. If the first direction is perpendicular to the second direction, the angle between the first direction and the second direction may be between 80° and 100°. If the first direction is parallel to the second direction, the angle between the first direction and the second direction may be between 0° and 10°.

It should be noted that the technical solutions provided by different embodiments hereinafter may be replaced, combined or used in combination, so as to constitute another embodiment without violating the spirit of the present disclosure.

Figure 2:
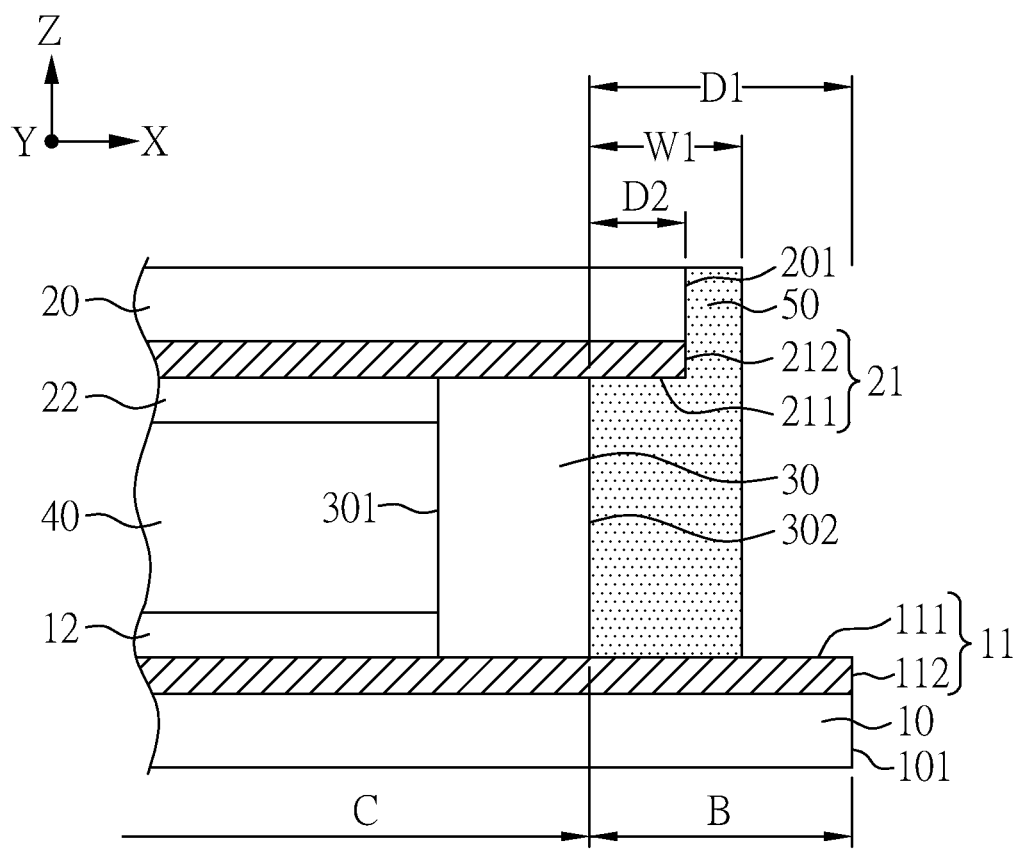
FIG. 2 is a perspective view of a part of an optical device according to one embodiment of the present disclosure.

FIG. 1 is a perspective view of an optical device according to one embodiment of the present disclosure. FIG. 2 is a perspective view of a part of an optical device according to one embodiment of the present disclosure.

As shown in FIG. 1, the optical device of the present disclosure may comprise: a first substrate 10 having a first side surface 101; a second substrate 20 having a second side surface 201, wherein the second substrate 20 is disposed opposite to the first substrate 10; a sealant 30 disposed between the first substrate 10 and the second substrate 20 and having a first side 301 and a second side 302, wherein the first side 301 is opposite to the second side 302; and a liquid crystal layer 40 disposed between the first substrate 10 and the second substrate 20 and locating at the first side 301 of the sealant 30.

In the present disclosure, as shown in FIG. 1, the first substrate 10 and the second substrate 20 may be arranged in parallel in a first direction X. More specifically, in a normal direction Z of the first substrate 10, at least part of a projection of the first substrate 10 and a projection of the second substrate 20 may not be overlapped, and/or at least part of the projection of the second substrate 20 and the projection of the first substrate 10 may not be overlapped. The sealant 30 may surround the liquid crystal layer 40, so the liquid crystal layer 40 is disposed in the space formed by the sealant 30, the first substrate 10 and the second substrate 20.

In the present disclosure, the materials of the first substrate 10 and the second substrate 20 may respectively comprise glass, quartz, sapphire, ceramics, polycarbonate (PC), polyimide (PI), polyethylene terephthalate (PET), polymethylmethacrylate (PMMA), triacetate cellulose (TAC), other suitable substrate materials or a combination thereof, but the present disclosure is not limited thereto. In addition, the first substrate 10 and the second substrate 20 may be prepared by using the same or different materials.

In the present disclosure, the material of the liquid crystal layer 40 may comprise guest host type liquid crystals (GHLCs), dye-doped liquid crystals, twisted nematic liquid crystals (TN LCs), super twisted nematic liquid crystals (STN LCs), polymer dispersed liquid crystals (PDLCs), polymer network liquid crystals (PNLCs), cholesteric texture liquid crystals, polymer-stabilized cholesteric texture liquid crystals (PSCT LCs), suspended particle materials (SPD), electrochromic materials, or a combination thereof, but the present disclosure is not limited thereto.

In the present disclosure, the optical device may be applied to liquid crystal windows, handwriting tablets, light transmission controllers, etc., but the present disclosure is not limited thereto. In some embodiments, the optical device may not comprise a color filter layer disposed on the first substrate 10 or the second substrate 20.

Hereinafter, a detail structure of the optical device of one embodiment of the present disclosure will be introduced in detail below.

As shown in FIG. 2, the optical device of the present disclosure may further comprise: a first conductive layer 11 disposed on the first substrate 10, wherein the first conductive layer 11 comprises a first surface 111 and a third side surface 112, the first surface 111 is connected to the third side surface 112, and the third side surface 112 is adjacent to the first side surface 101 of the first substrate 10; and a second conductive layer 21 disposed on the second substrate 20, wherein the second conductive layer 21 comprises a second surface 211 and a fourth side surface 212, the second surface 211 is connected to the and the fourth side surface 212, and the fourth side surface 212 is adjacent to the second side surface 201 of the second substrate 20. The sealant 30 is disposed between the first conductive layer 11 and the second conductive layer 21, and the liquid crystal layer 40 is disposed between the first conductive layer 11 and the second conductive layer 21. In some embodiments, the sealant 30 may directly contact the first conductive layer 11 and the second conductive layer 21 respectively.

In the present disclosure, the materials of the first conductive layer 11 and the second conductive layer 21 may respectively comprise a metal, a metal oxide, an alloy thereof, or a combination thereof, such as gold, silver, copper, aluminum, chromium, platinum, indium zinc oxide (IZO), indium tin oxide (ITO), indium tin zinc oxide (ITZO), indium gallium zinc oxide (IGZO), or aluminum zinc oxide (AZO), but the present disclosure is not limited thereto. In addition, the first conductive layer 11 and the second conductive layer 21 may be prepared by the same or different materials. In some embodiments, the materials of the first conductive layer 11 and the second conductive layer 21 may respectively comprise a metal oxide.

After high-temperature or long-term operation, moisture may easily permeate into the optical device, resulting in the deterioration of the optical device with abnormal appearance such as bubbles or discoloration of the liquid crystal layer. Therefore, the optical device of the present disclosure may further comprise a barrier layer 50 disposed between the first conductive layer 11 and the second conductive layer 21 and locating at the second side 302 of the sealant 30, wherein at least part of the first surface 111 and the third side surface 112 are not covered by the barrier layer 50. The barrier layer 50 can be used to reduce the permeation of the moisture into the optical device, thereby reducing the risk of the deterioration of the optical device. In some embodiments, the barrier layer 50 may not be in contact with at least part of the first surface 111 and the third side surface 112. In some embodiments, the fourth side surface 212 may be covered by the barrier layer 50. In some embodiments, the barrier layer 50 may be in contact with at least part of the second surface 211 and the fourth side surface 212. In some embodiments, the barrier layer 50 may be in contact with the second side surface 201 of the second substrate 20. In addition, even not shown in the figure, the first conductive layer 11 may be electrically connected to an external signal source through the part of the first surface 111 not covered by the barrier layer 50 to drive the optical device.

In the present disclosure, a material of the barrier layer 50 may comprise an oxide, an organic compound, a polymer, or a combination thereof, such as polyvinylidene chloride, aluminum oxide, silicon oxide, silicon nitride, silicon oxynitride, or a combination thereof, but the present disclosure is not limited thereto. In some embodiments, the material of the barrier layer 50 may comprise an oxide. In the present disclosure, the water vapor transmission rate (WVTR) of the barrier layer 50 may be less than or equal to 10 g/m$^2$/day (WVTR≤10 g/m$^2$/day). Herein, the water vapor transmission rate can be measured by Mocon measurement method. One side of the sample to be tested is injected with high-concentration moisture or high-concentration oxygen, while the other side is introduced with dry nitrogen gas. The permeated moisture or oxygen is introduced to a highly sensitive detector. The moisture or oxygen passage per unit area per day under specific temperature and humidity is calculated. This test method complies with the testing standards of the American Society for Testing and Materials (ASTM). In the present disclosure, the water absorption of the material of the barrier layer 50 may be less than or equal to 0.12% (water absorption≤0.12%). Herein, the water absorption can be measured by a standard test method, ASTM D570 water absorption of plastics. Test samples are made into 0.13 mm (0.005 inch) sheets and immersed in water for a specified period of time to evaluate the increase percent in sample weight after testing. In the present disclosure, the material of the barrier layer 50 may be, for example, a hydrophobic material, and the contact angle of the material of the barrier layer 50 may be greater than or equal to 80° (contact angle≥80°). In the present disclosure, the barrier layer 50 may be prepared by a suitable coating method, such as spray coating, spin coating, or vapor deposition, but the present disclosure is not limited thereto. In addition, the barrier layer 50 can be a single coating layer or multiple coating layers.

In the present disclosure, as shown in FIG. 2, the optical device may comprise a central region C and a peripheral region B adjacent to the central region C, and the peripheral region B locates at the second side 302 of the sealant 30. Herein, at least a part of the first conductive layer 11 and at least a part of the second conductive layer 21 may be respectively extended from the central region C and disposed in the peripheral region B, and the barrier layer 50 is disposed in the peripheral region B. In the first direction X, the barrier layer 50 has a first width W1, there is a first distance D1 between the second side 302 of the sealant 30 and the third side surface 112 of the first conductive layer 11, there is a second distance D2 between the second side 302 of the sealant 30 and the fourth side surface 212 of the second conductive layer 21, and the first width W1 is greater or equal to the second distance D2 and less than or equal to the first distance D1 (first distance D1≥first width W1≥second distance D2). In some embodiments, the first width W1 may be greater than 0 nm, for example, the first width W1 may be greater than 0.05 nm. When the first width W1 meets the above range, it can have the effect of blocking moisture.

In the present disclosure, as shown in FIG. 2, the optical device may further comprise: a first alignment layer 12 disposed on the first conductive layer 11 and locating at the first side 301 of the sealant 30; and a second alignment layer 22 disposed on the second conductive layer 21 and locating at the first side 301 of the sealant 30. In the present disclosure, the first alignment layer 12 and the second alignment layer 22 may be in direct contact with the liquid crystal layer 40 respectively to achieve the alignment function. In some embodiments, the first alignment layer 12 and the second alignment layer 22 may be in contact with the sealant 30 respectively, but the present disclosure is not limited thereto.

Figure 3A:
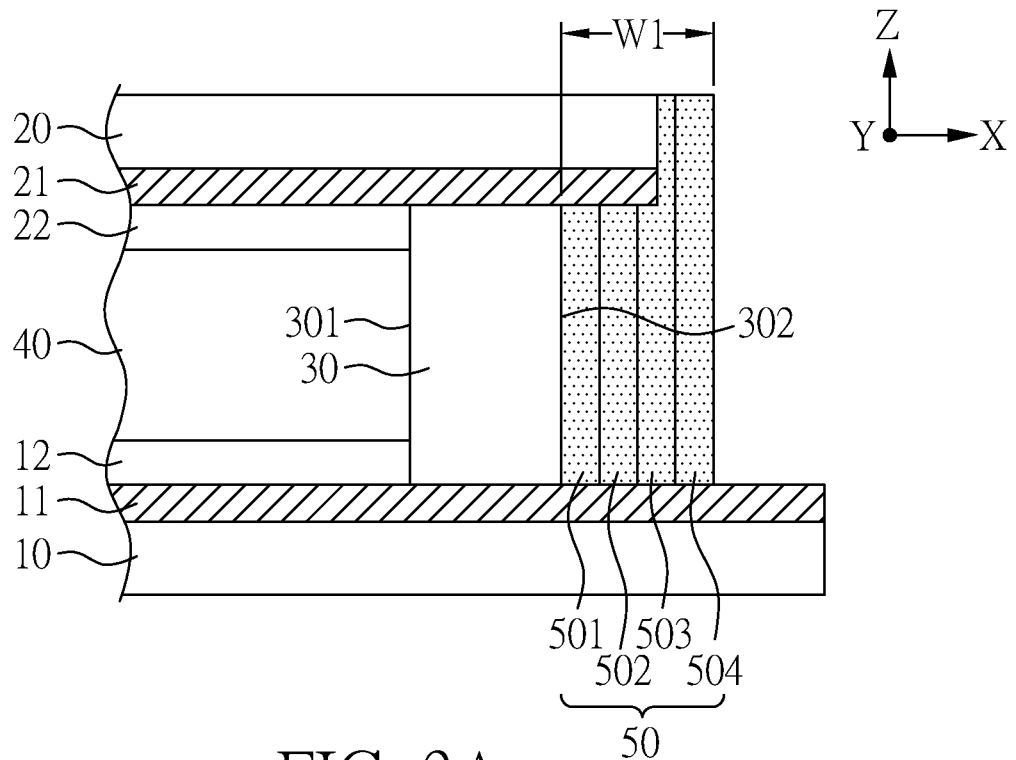
FIG. 3A and FIG. 3B are perspective views of a part of an optical device according to one embodiment of the present disclosure.
Figure 3B:
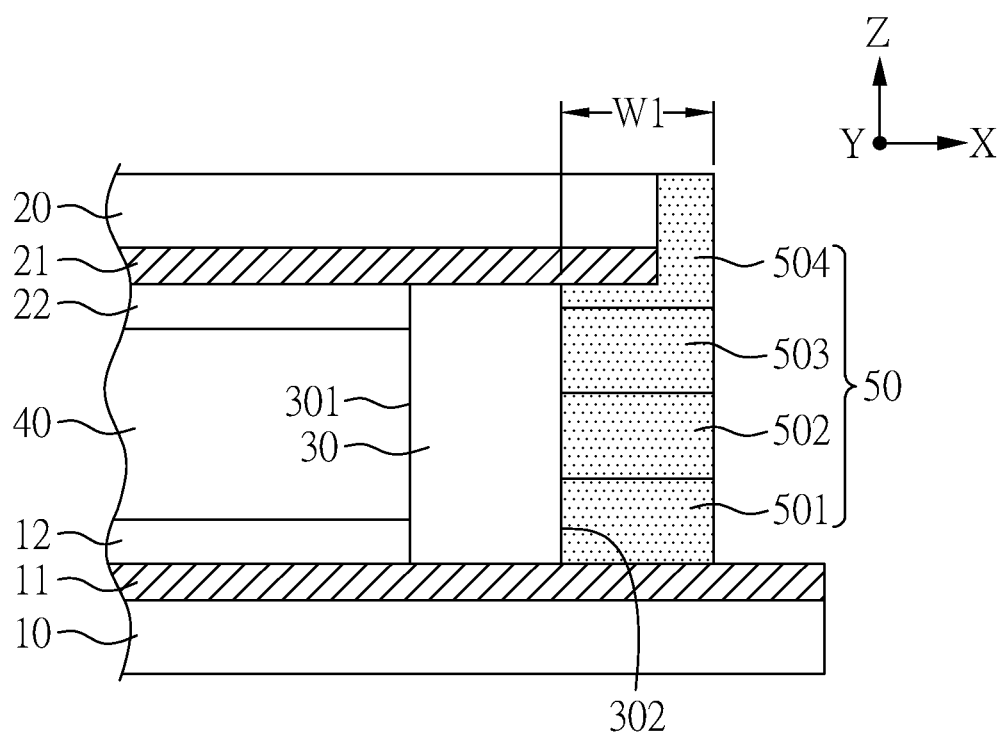

FIG. 3A and FIG. 3B are perspective views of a part of an optical device according to one embodiment of the present disclosure. Herein, the optical devices in FIG. 3A and FIG. 3B are similar to that in FIG. 2, except for the following differences.

In the present disclosure, as shown in FIG. 3A and FIG. 3B, the barrier layer 50 may be multiple coating layers. More specifically, the barrier layer 50 may comprise a plurality of layers, such as the first layer 501, the second layer 502, the third layer 503 and the fourth layer 504, but the present disclosure is not limited thereto. In some embodiments, the barrier layer 50 may comprise two layers, three layers, or more than four layers. In addition, the first layer 501, the second layer 502, the third layer 503 and the fourth layer 504 may be prepared by the same material of the barrier layer 50. The material and coating method of the barrier layer 50 are similar to those described above, and are not repeated here.

In some embodiments, as shown in FIG. 3A, these layers (such as the first layer 501, the second layer 502, the third layer 503 and the fourth layer 504) may be laminated along the horizontal direction of the first substrate 10 (for example, the first direction X). The first width W1 of the barrier layer 50 may be the sum of the widths of the first layer 501, the second layer 502, the third layer 503 and the fourth layer 504 in the first direction X. In some embodiments, as shown in FIG. 3B, these layers (such as the first layer 501, the second layer 502, the third layer 503 and the fourth layer 504) may be laminated along the vertical direction of the first substrate 10 (for example, the normal direction Z of the first substrate 10). The first width W1 of the barrier layer 50 may be the width (for example, the maximum width) of the first layer 501, the second layer 502, the third layer 503 or the fourth layer 504 in the first direction X.

Figure 4A:
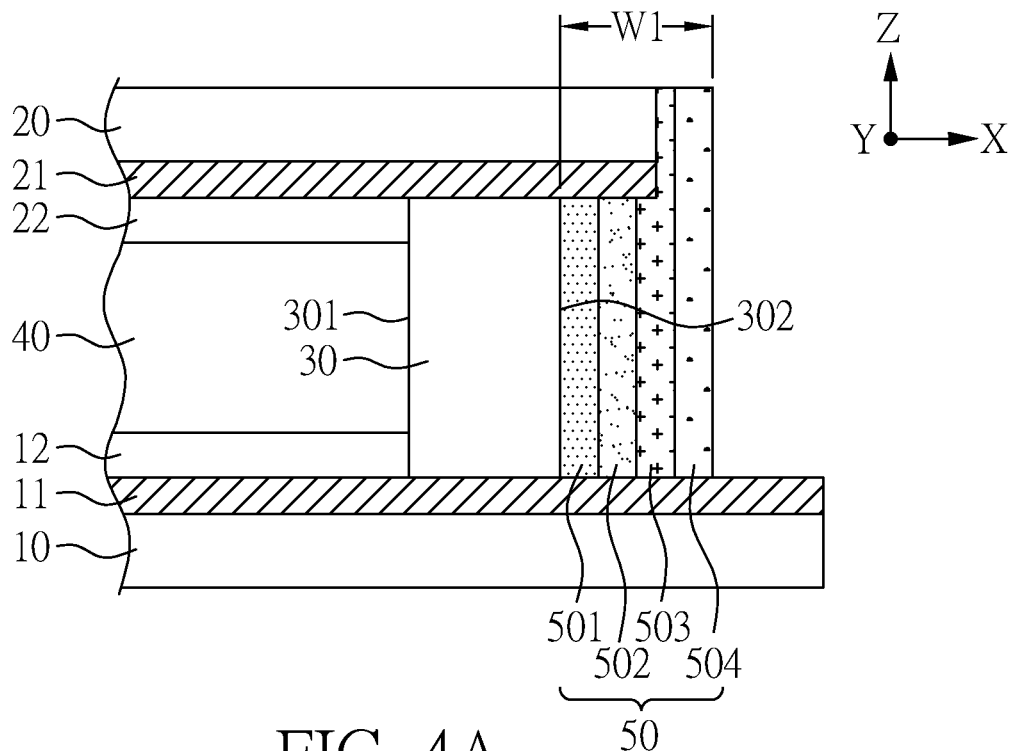
FIG. 4A and FIG. 4B are perspective views of a part of an optical device according to one embodiment of the present disclosure.
Figure 4B:
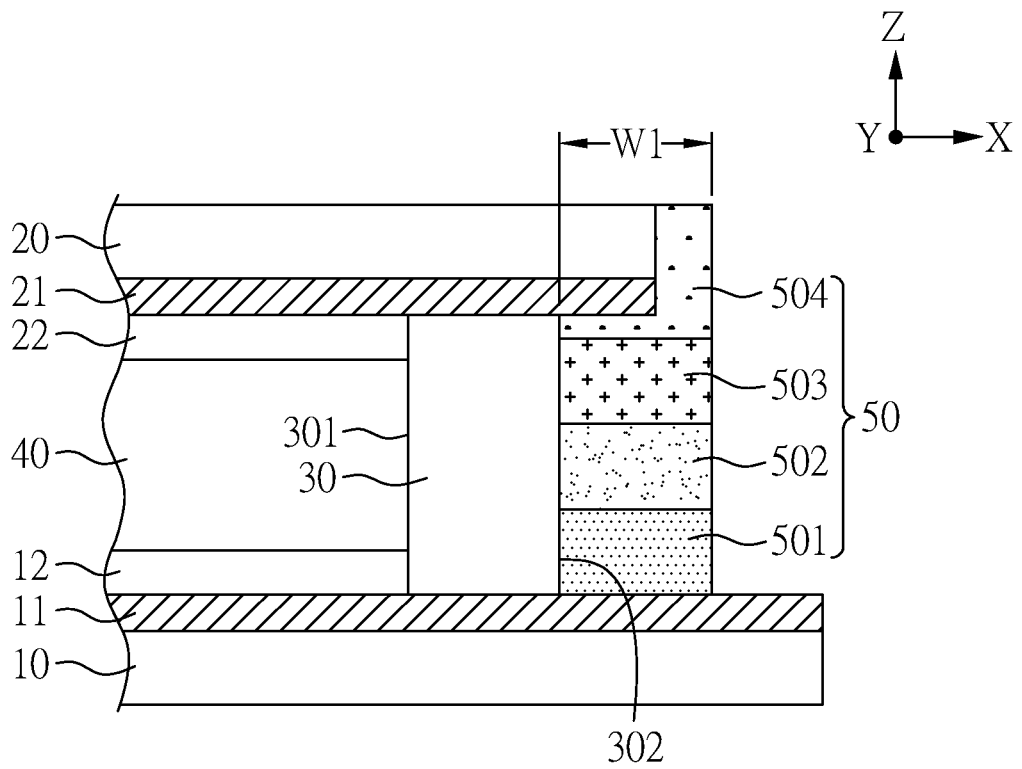

FIG. 4A and FIG. 4B are perspective views of a part of an optical device according to one embodiment of the present disclosure. Herein, the optical devices in FIG. 4A and FIG. 4B are similar to that in FIG. 2, except for the following differences.

In the present disclosure, as shown in FIG. 4A and FIG. 4B, the barrier layer 50 may be multiple coating layers. More specifically, the barrier layer 50 may comprise a plurality of layers, such as the first layer 501, the second layer 502, the third layer 503 and the fourth layer 504, but the present disclosure is not limited thereto. In some embodiments, the barrier layer 50 may comprise two layers, three layers, or more than four layers. In addition, the materials of at least two of the first layer 501, the second layer 502, the third layer 503 and the fourth layer 504 are different from each other. In the present embodiment, the materials of the first layer 501, the second layer 502, the third layer 503 and the fourth layer 504 are different from each other, but the present disclosure is not limited thereto. Furthermore, the material and coating method of the barrier layer 50 are similar to those described above, and are not repeated here.

In some embodiments, as shown in FIG. 4A, these layers (such as the first layer 501, the second layer 502, the third layer 503 and the fourth layer 504) may be laminated along the horizontal direction of the first substrate 10 (for example, the first direction X). The first width W1 of the barrier layer 50 may be the sum of the widths of the first layer 501, the second layer 502, the third layer 503 and the fourth layer 504 in the first direction X. In some embodiments, as shown in FIG. 4B, these layers (such as the first layer 501, the second layer 502, the third layer 503 and the fourth layer 504) may be laminated along the vertical direction of the first substrate 10 (for example, the normal direction Z of the first substrate 10). The first width W1 of the barrier layer 50 may be the width (for example, the maximum width) of the first layer 501, the second layer 502, the third layer 503 or the fourth layer 504 in the first direction X.

Figure 5:
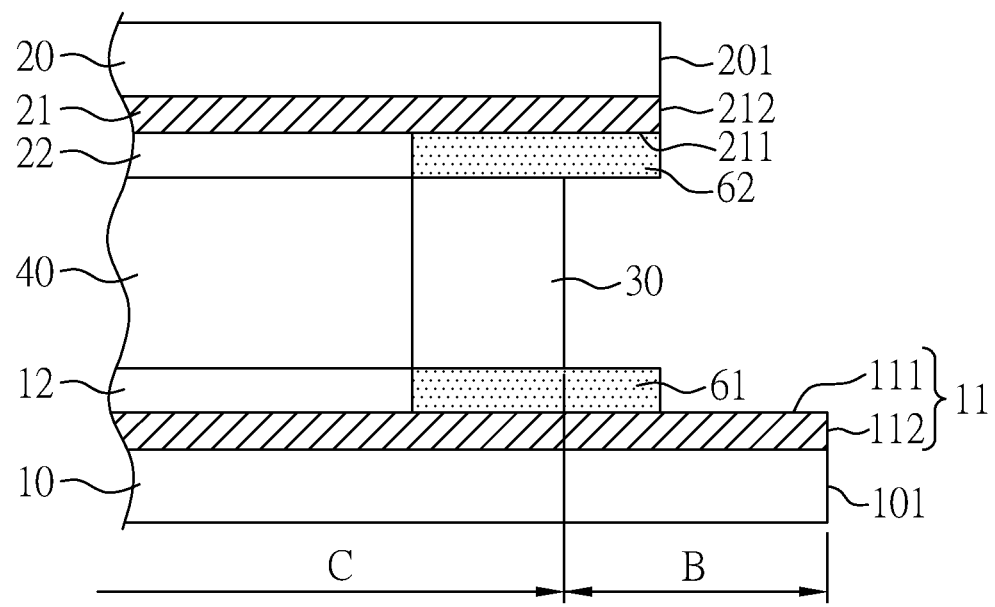
FIG. 5 is a perspective view of a part of an optical device according to another embodiment of the present disclosure.

FIG. 5 is a perspective view of a part of an optical device according to another embodiment of the present disclosure. Herein, the optical device in FIG. 5 is similar to that in FIG. 2, except for the following differences.

As shown in FIG. 5, the optical device of the present disclosure may further comprise: a first insulating layer 61 disposed on the first conductive layer 11 and disposed between the first conductive layer 11 and the sealant 30; and a second insulating layer 62 disposed on the second conductive layer 21 and disposed between the second conductive layer 21 and the sealant 30. The first insulating layer 61 and the second insulating layer 62 can be used to reduce the risk of a short circuit between the first conductive layer 11 and the second conductive layer 21, thereby improving the reliability of the optical device.

More specifically, when moisture exists in the peripheral region B of the optical device, a short circuit is likely to occur between the first conductive layer 11 and the second conductive layer 21, resulting in the deterioration of the optical device. Therefore, the first insulating layer 61 and the second insulating layer 62 may be respectively extended and a part of the first insulating layer 61 and a part of the second insulating layer 62 may be disposed in the peripheral region B to reduce the risk of short circuit between the first conductive layer 11 and the second conductive layer 21. In some embodiments, the first insulating layer 61 and the second insulating layer 62 are partially overlapped with the sealant 30 respectively in the normal direction Z of the first substrate 10. In some embodiments, a part of the first insulating layer 61 and a part of the second insulating layer 62 may be in contact with the sealant 30 respectively, to improve the reliability of the optical device.

In addition, as shown in FIG. 5, at least a part of the first surface 111 and the third side surface 112 of the first conductive layer 11 are not covered by the first insulating layer 61. Therefore, even not shown in the figure, the first conductive layer 11 can be electrically connected to an external signal source through the part of the first surface 111 not covered by the first insulating layer 61 to drive the optical device.

In the present disclosure, the materials of the first insulating layer 61 and the second insulating layer 62 may respectively comprise an oxide, such as silicon oxide, silicon nitride, silicon oxynitride or a combination thereof, but the present disclosure is not limited thereto. In the present disclosure, the impedances of the first insulating layer 61 and the second insulating layer 62 may be respectively greater than 0.5 MΩ/□.

In addition, the first insulating layer 61 and the second insulating layer 62 may be prepared using the same or different materials. In the present disclosure, the first insulating layer 61 and the second insulating layer 62 may be respectively prepared by using a suitable coating method, such as spray coating, spin coating, or vapor deposition, but the present disclosure is not limited thereto. In addition, the first insulating layer 61 and the second insulating layer 62 may respectively be a single coating layer or multiple coating layers. In the present disclosure, the thicknesses of the first insulating layer 61 and the second insulating layer 62 may respectively be greater than or equal to 0.05 nm. When the thicknesses of the first insulating layer 61 and the second insulating layer 62 meet the above range, the short circuit problem can be reduced.

Figure 6A:
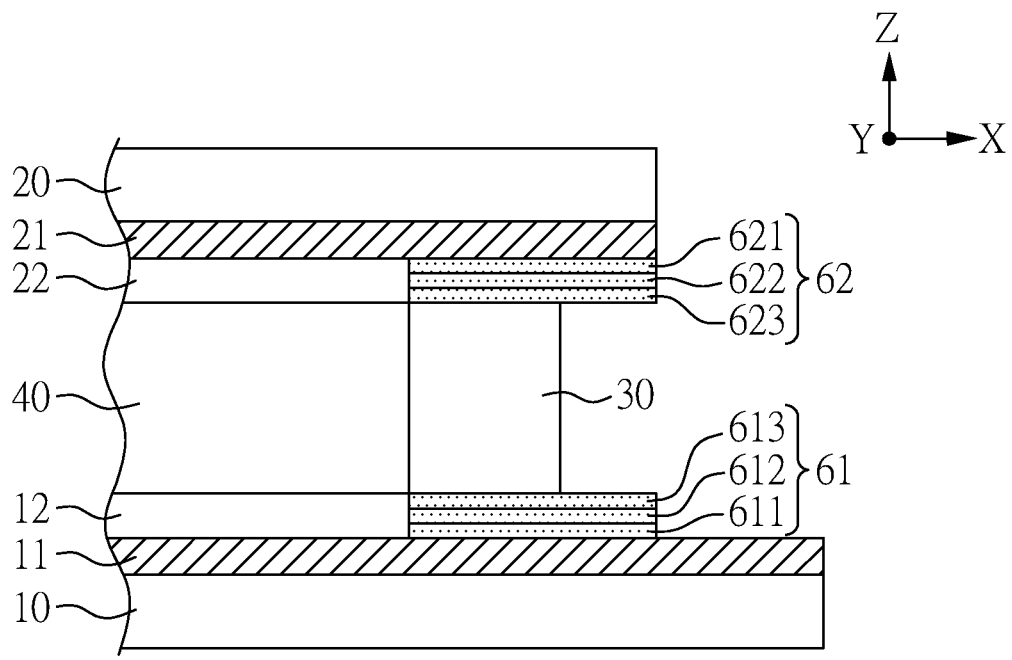
FIG. 6A and FIG. 6B are perspective views of a part of an optical device according to another embodiment of the present disclosure.
Figure 6B:
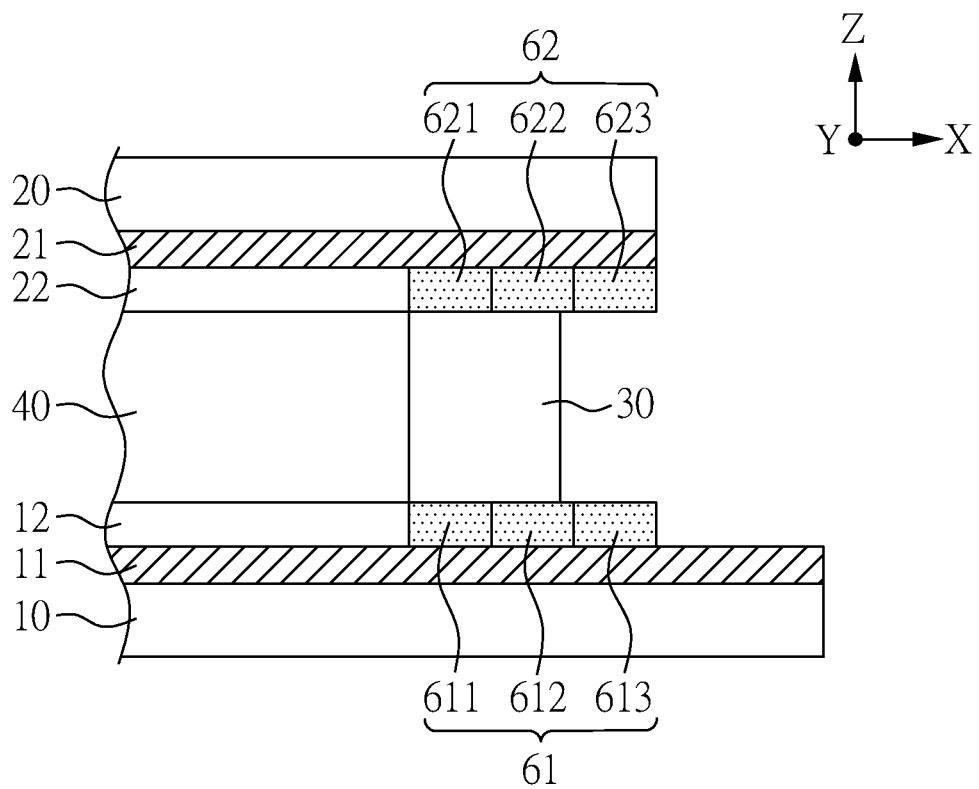

FIG. 6A and FIG. 6B are perspective views of a part of an optical device according to another embodiment of the present disclosure. Herein, the optical devices in FIG. 6A and FIG. 6B are similar to that in FIG. 5, except for the following differences.

In the present disclosure, as shown in FIG. 6A and FIG. 6B, the first insulating layer 61 and the second insulating layer 62 may respectively be multiple coating layers. More specifically, the first insulating layer 61 and the second insulating layer 62 may respectively comprise a plurality of layers, such as the first layer 611, the second layer 612, the third layer 613, the fourth layer 621, the fifth layer 622 and the sixth layer 623, but the present disclosure is not limited thereto. In some embodiments, the first insulating layer 61 and the second insulating layer 62 may respectively comprise two layers, or more than three layers. In addition, the first layer 611, the second layer 612, the third layer 613, the fourth layer 621, the fifth layer 622 and the sixth layer 623 may be prepared by using the same material. The material and coating method of the first insulating layer 61 and the second insulating layer 62 are similar to those described above, and are not repeated here.

In some embodiments, as shown in FIG. 6A, these layers (such as the first layer 611, the second layer 612, the third layer 613, the fourth layer 621, the fifth layer 622 and the sixth layer 623) may be laminated along the vertical direction of the first substrate 10 (for example, the normal direction Z of the first substrate 10). The thickness of the first insulating layer 61 may be the sum of the thicknesses of the first layer 611, the second layer 612 and the third layer 613 in the normal direction Z of the first substrate 10, and the thickness of the second insulating layer 62 may be the sum of the thicknesses of the fourth layer 621, the fifth layer 622 and the sixth layer 623 in the normal direction Z of the first substrate 10. In some embodiments, as shown in FIG. 6B, these layers (such as the first layer 611, the second layer 612, the third layer 613, the fourth layer 621, the fifth layer 622 and the sixth layer 623) may be laminated along the horizontal direction of the first substrate 10 (for example, the first direction X). The thickness of the first insulating layer 61 may be the thickness (for example, the maximum thickness) of the first layer 611, the second layer 612 or the third layer 613 in the normal direction Z of the first substrate 10, and the thickness of the second insulating layer 62 may be the thickness (for example, the maximum thickness) of the fourth layer 621, the fifth layer 622 or the sixth layer 623 in the normal direction Z of the first substrate 10.

Figure 7A:
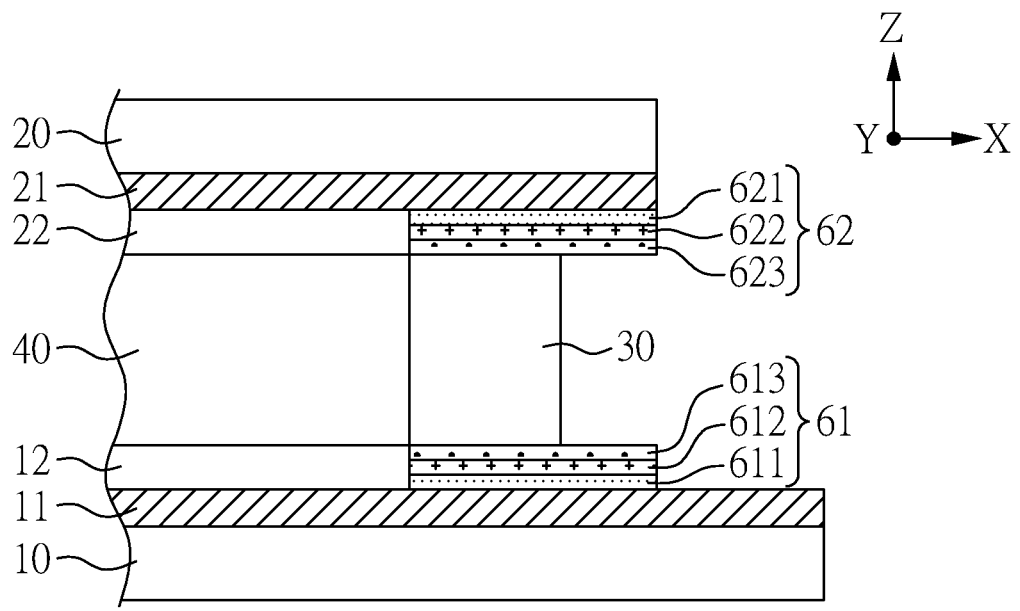
FIG. 7A and FIG. 7B are perspective views of a part of an optical device according to another embodiment of the present disclosure.
Figure 7B:
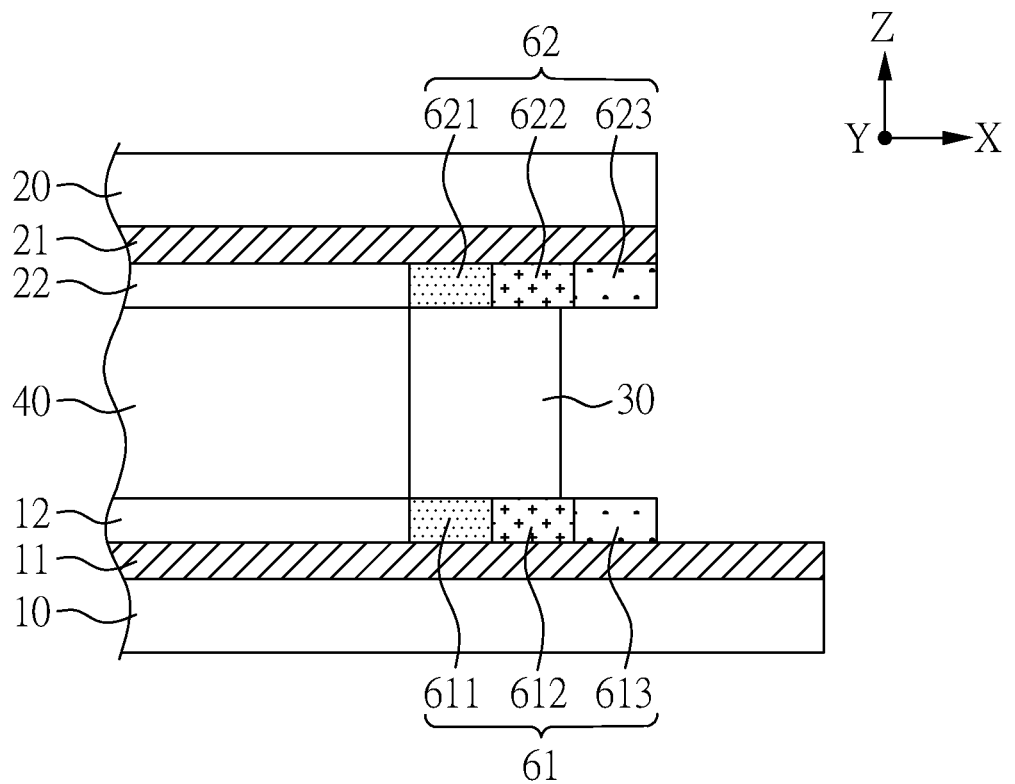

FIG. 7A and FIG. 7B are perspective views of a part of an optical device according to another embodiment of the present disclosure. Herein, the optical devices in FIG. 7A and FIG. 7B are similar to that in FIG. 5, except for the following differences.

In the present disclosure, as shown in FIG. 7A and FIG. 7B, the first insulating layer 61 and the second insulating layer 62 may respectively be multiple coating layers. More specifically, the first insulating layer 61 and the second insulating layer 62 may respectively comprise a plurality of layers, such as the first layer 611, the second layer 612, the third layer 613, the fourth layer 621, the fifth layer 622 and the sixth layer 623, but the present disclosure is not limited thereto. In some embodiments, the first insulating layer 61 and the second insulating layer 62 may respectively comprise two layers, or more than three layers. In addition, the first layer 611, the second layer 612, the third layer 613, the fourth layer 621, the fifth layer 622 and the sixth layer 623 may be prepared by different materials. More specifically, the materials of at least two of the first layer 611, the second layer 612 and the third layer 613 of the first insulating layer 61 are different from each other; and the materials of at least two of the fourth layer 621, the fifth layer 622 and the sixth layer 623 of the second insulating layer 62 are different from each other. In the present embodiment, the materials of the first layer 611, the second layer 612 and the third layer 613 of the first insulating layer 61 are different from each other; and the materials of the fourth layer 621, the fifth layer 622 and the sixth layer 623 of the second insulating layer 62 are different from each other; but the present disclosure is not limited thereto. The material and coating method of the first insulating layer 61 and the second insulating layer 62 are similar to those described above, and are not repeated here.

In some embodiments, as shown in FIG. 7A, these layers (such as the first layer 611, the second layer 612, the third layer 613, the fourth layer 621, the fifth layer 622 and the sixth layer 623) may be laminated along the vertical direction of the first substrate 10 (for example, the normal direction Z of the first substrate 10). The thickness of the first insulating layer 61 may be the sum of the thicknesses of the first layer 611, the second layer 612 and the third layer 613 in the normal direction Z of the first substrate 10, and the thickness of the second insulating layer 62 may be the sum of the thicknesses of the fourth layer 621, the fifth layer 622 and the sixth layer 623 in the normal direction Z of the first substrate 10. In some embodiments, as shown in FIG. 7B, these layers (such as the first layer 611, the second layer 612, the third layer 613, the fourth layer 621, the fifth layer 622 and the sixth layer 623) may be laminated along the horizontal direction of the first substrate 10 (for example, the first direction X). The thickness of the first insulating layer 61 may be the thickness (for example, the maximum thickness) of the first layer 611, the second layer 612 or the third layer 613 in the normal direction Z of the first substrate 10, and the thickness of the second insulating layer 62 may be the thickness (for example, the maximum thickness) of the fourth layer 621, the fifth layer 622 or the sixth layer 623 in the normal direction Z of the first substrate 10.

The specific embodiments above should be interpreted as illustrative only, not limiting the rest of the present disclosure in any way, and the features of different embodiments can be mixed and matched as long as they do not conflict with each other.

Although the present disclosure has been explained in relation to its embodiment, it is to be understood that many other possible modifications and variations can be made without departing from the spirit and scope of the disclosure as hereinafter claimed.

The invention claimed is:

1. An optical device, comprising:
   a first substrate;
   a second substrate disposed opposite to the first substrate;
   a first conductive layer disposed on the first substrate, wherein the first conductive layer comprises a first surface and a third side surface, and the first surface is connected to the third side surface;
   a second conductive layer disposed on the second substrate, wherein the second conductive layer has a second surface and a fourth side surface, and the second surface is connected to a fourth side surface;
   a sealant disposed between the first conductive layer and the second conductive layer and having a first side and a second side, wherein the first side is opposite to the second side;
   a liquid crystal layer disposed between the first surface and the second surface and locating at the first side of the sealant; and
   a barrier layer disposed between the first conductive layer and the second conductive layer and locating at the second side of the sealant, wherein the fourth side surface is covered by the barrier layer,
   wherein at least part of the first surface and the third side surface are not covered by the barrier layer.

2. The optical device of claim 1, wherein in a first direction, the barrier layer has a first width, there is a first distance between the second side of the sealant and the third side surface of the first conductive layer, there is a second distance between the second side of the sealant and the fourth side surface of the second conductive layer, and the first width is greater or equal to the second distance and less than or equal to the first distance.

3. The optical device of claim 1, wherein the optical device does not comprise a color filter layer disposed on the first substrate or the second substrate.

4. The optical device of claim 1, wherein the optical device is a liquid crystal window.

5. The optical device of claim 1, wherein a water vapor transmission rate of the barrier layer is less than or equal to 10 g/m$^2$/day.

6. The optical device of claim 1, wherein a water absorption of a material of the barrier layer is less than or equal to 0.12%.

7. The optical device of claim 1, wherein a contact angle of the barrier layer is greater than or equal to 80°.

8. The optical device of claim 1, wherein the optical device comprises a central region and a peripheral region adjacent to the central region, and at least a part of the first conductive layer and at least a part of the second conductive layer are disposed in the peripheral region.

9. The optical device of claim 1, further comprising:
a first alignment layer disposed on the first conductive layer; and
a second alignment layer disposed on the second conductive layer,
wherein the first alignment layer and the second alignment layer are in direct contact with the liquid crystal layer respectively.

10. An optical device, comprising:
a first substrate having a first side surface;
a second substrate having a second side surface, wherein the second substrate is disposed opposite to the first substrate;
a first conductive layer disposed on the first substrate, wherein the first conductive layer has a third side surface, and the third side surface is adjacent to the first side surface;
a second conductive layer disposed on the second substrate, wherein the second conductive layer has a fourth side surface, and the fourth side surface is adjacent to the second side surface;
a sealant disposed between the first conductive layer and the second conductive layer;
a liquid crystal layer disposed between the first conductive layer and the second conductive layer, wherein the sealant surrounds the liquid crystal layer;
a first insulating layer disposed on the first conductive layer and disposed between the first conductive layer and the sealant; and
a second insulating layer disposed on the second conductive layer and disposed between the second conductive layer and the sealant,
wherein in a cross section view, the sealant has a first side contacting the liquid crystal layer and a second side opposite to the first side, the third side surface has a first extension line, and the fourth side surface has a second extension line,
wherein a distance between the second side of the sealant and the first extension line of the third side surface is greater than a distance between the second side of the sealant and the second extension line of the fourth side surface.

11. The optical device of claim 10, wherein impedances of the first insulating layer and the second insulating layer are respectively greater than 0.5 MΩ/□.

12. The optical device of claim 10, wherein the first insulating layer and the second insulating layer are partially overlapped with the sealant respectively in a normal direction of the first substrate.

13. The optical device of claim 10, wherein a part of the first insulating layer and a part of the second insulating layer are respectively in contact with the sealant.

14. The optical device of claim 10, wherein the optical device does not comprise a color filter layer disposed on the first substrate or the second substrate.

15. The optical device of claim 10, wherein the optical device is a liquid crystal window.

16. The optical device of claim 10, wherein the optical device comprises a central region and a peripheral region adjacent to the central region, and at least a part of the first conductive layer and at least a part of the second conductive layer are disposed in the peripheral region.

17. The optical device of claim 16, wherein a part of the first insulating layer and a part of the second insulating layer are disposed in the peripheral region.

18. The optical device of claim 10, further comprising:
a first alignment layer disposed on the first conductive layer; and
a second alignment layer disposed on the second conductive layer,
wherein the first alignment layer and the second alignment layer are in direct contact with the liquid crystal layer respectively.

19. The optical device of claim 10, wherein the first conductive layer has a first surface connected to the third side surface, and at least a part of the first surface and the third side surface are not covered by the first insulating layer.

* * * * *